Sept. 7, 1926. 1,599,307
E. E. WARD
CULVERT CLEANING DEVICE
Filed April 30, 1926 2 Sheets-Sheet 1
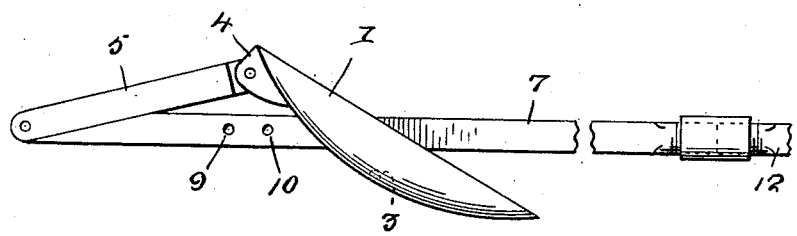
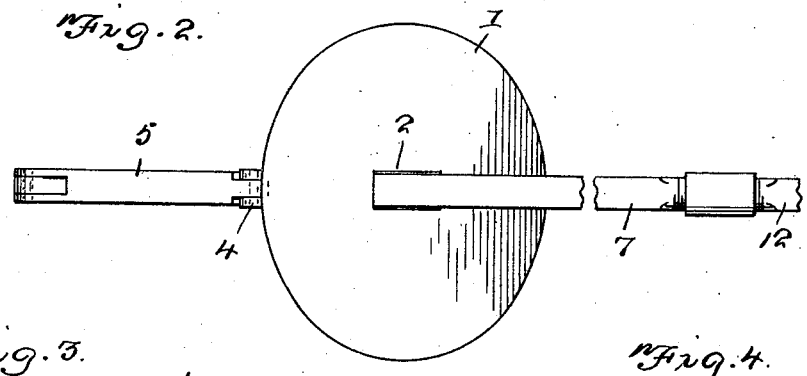
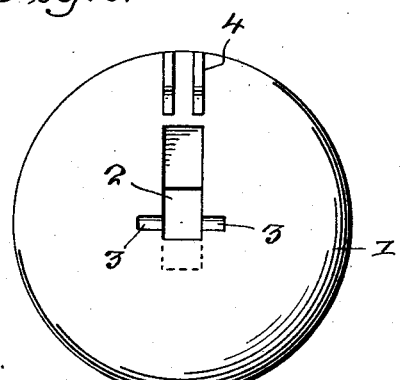
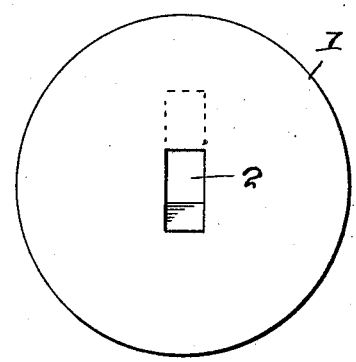
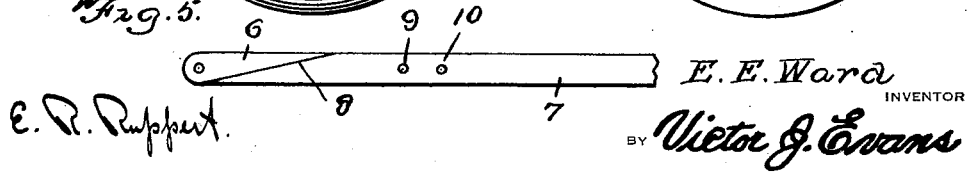

Sept. 7, 1926.
E. E. WARD
1,599,307
CULVERT CLEANING DEVICE
Filed April 30, 1926
2 Sheets-Sheet 2
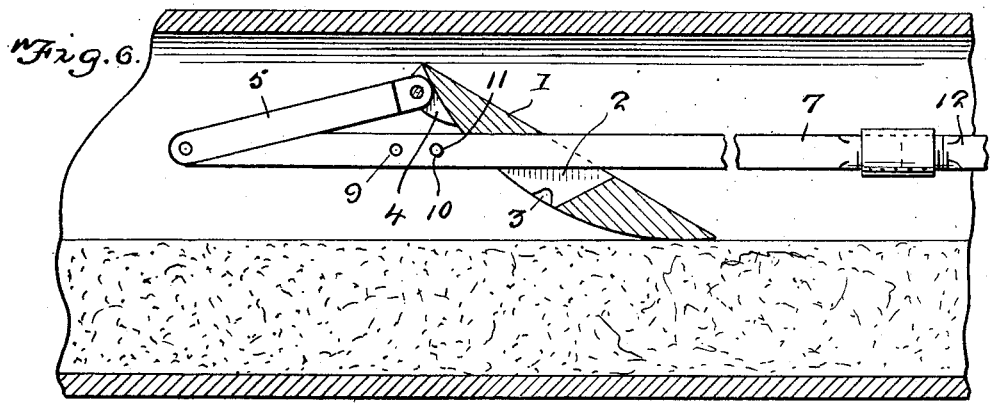
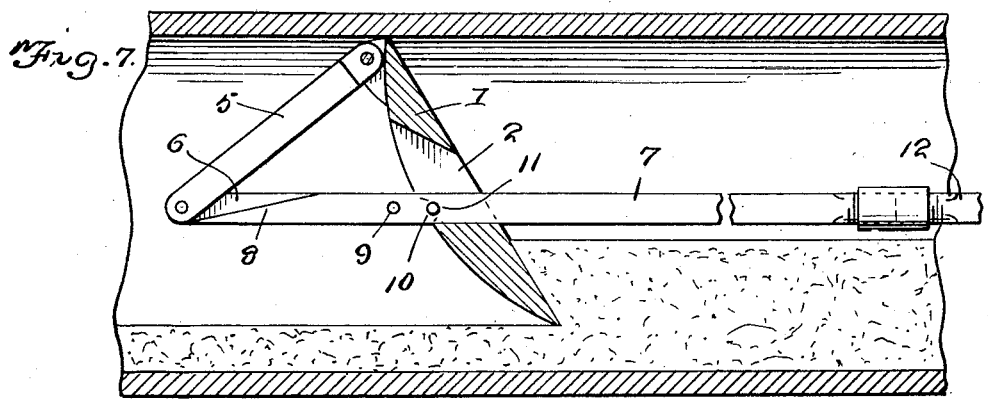
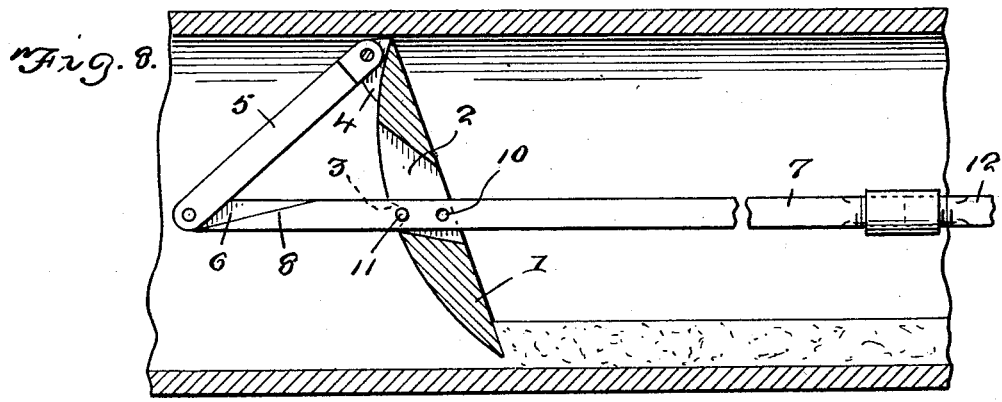

Patented Sept. 7, 1926.

1,599,307

UNITED STATES PATENT OFFICE.

ERNEST ERWIN WARD, OF HARRISON, MAINE.

CULVERT-CLEANING DEVICE.

Application filed April 30, 1926. Serial No. 105,793.

My present invention has reference to an extremely simple, cheaply constructed and thoroughly efficient device for cleaning drainage culverts of sand, leaves and other matters.

A further object is the provision of a device for this purpose in which the cleaning element is in the nature of a disc provided with an operating rod associated therewith in a manner whereby the disc will be sustained at desired angles with respect to the said operating rod, so that the disc will bite into the material to be removed from the culvert at different depths as desired by the operator.

To the attainment of the above broadly stated objects and others which will present themselves as the nature of the invention is better understood, the improvement further resides in certain novel features of construction, combination and operative association of parts, a satisfactory embodiment of which is illustrated by the drawings which accompany and form part of this application.

In the drawings:

Figure 1 is a side elevation of my improvement showing the position of the disc when the device is to be inserted in a culvert.

Figure 2 is a top plan view of the construction as illustrated by Figure 1.

Figure 3 is a rear elevation of the disc cutter.

Figure 4 is a front elevation thereof.

Figure 5 is a side elevation of the operating rod.

Figure 6 is a view showing the device arranged in the culvert.

Figure 7 is a similar view showing the disc cutter swung to a determined angle on the operating rod.

Figure 8 is a similar view but showing the disc swung to a less determined angle.

The cutter element of my improvement, as illustrated by the drawings, is in the nature of a disc 1. The disc is gradually decreased in thickness from its center to its edge and, of course, its edge is sharpened. The disc, at the center thereof, has a rectangular opening 2 therethrough. The opposite or end walls provided by this opening are arranged at angles, and the rear of the disc, at the side in a line with the side walls provided by the opening 2 is provided with depressions or aligning notches 3. The disc upon its rounded face, and in a line with the side walls provided by the opening 2, is formed with a pair of spaced ears 4, and between these ears there is pivoted a link 5. The link has a bifurcated outer end that has received therein and pivoted thereto the web portion 6 on an operating rod 7. The web 6 is formed by centrally reducing one end of the rod 7 and by beveling the lower walls 8 provided by said reduced portions. The operating rod 7 is formed with spaced transverse openings 9 and 10, and each of these openings is designed to receive therethrough but not at the same time, a laterally projecting pin 11, and this pin is adapted to be received in the notch or depression 3 on the rounded face of the disc 1. The operating rod 7 is provided with a handle extension 12, there preferably being removable means for associating the handle section with the rod.

With a device as above described it will be seen that the disc can be readily inserted in a culvert when arranged as disclosed by Figures 1 and 2 of the drawings, and that the rounded face of the disc will permit of the same gliding over the material which has partly filled the culvert. When the pin 11 is arranged in the opening 10, and a forward pull is exerted on the handle and the operating rod 7, this pin will be moved into the depression 3 and will cant or tilt the disc to the angle disclosed by Figure 7 of the drawings. The movement of the disc through the culvert will, of course, draw through the said culvert a determined quantity of the material which has accumulated in said culvert so that the operator can thereafter rearrange the pin 11 in the opening 9, causing the disc to assume a more determined angle as disclosed by Figure 8 of the drawings.

It is obvious that different sized discs will be used on the same handle to clean pipes of different diameters and while it is believed that the foregoing description when read will fully set forth the simplicity and advantages of my improvement it is to be understood that I do not wish to be restricted to the precise details of construction herein set forth and hold myself entitled to such changes therefrom as fairly fall within the scope of what I claim.

Having described the invention, I claim:—

1. A culvert cleaning device comprising a sharpened member, an operating rod passing centrally through the member, said rod having spaced transverse openings therethrough a link connection between the rod and member, and a pin designed to be passed through one of the openings in the operating rod to contact with one face of the member for holding the same at desired angles on the rod.

2. A culvert cleaning device, including a cutter disc whose rear face is rounded and which has a substantially rectangular opening therethrough, and having depressions on its rounded face at the opposite sides of the opening, said disc having its said rounded face in a line with the opening formed with ears, a link member pivoted between the ears, an operating rod movable through the opening in the disc and a reduced rib on one end thereof to which the link is pivoted, and said rod having spaced openings therethrough and a pin designed to be passed through either one of said openings and to be received in the depressions in the rounded face of the disc for holding the disc at desired angles with respect to the rod.

In testimony whereof I affix my signature.

ERNEST ERWIN WARD.